United States Patent [19]
Horiishi et al.

[11] 4,136,049
[45] Jan. 23, 1979

[54] PROCESS FOR TREATING ACICULAR MAGNETITE CONTAINING Co TO STABILIZE THE MAGNETIC PROPERTIES THEREOF

[75] Inventors: Nanao Horiishi; Atushi Takedoi; Hiroyuki Kondo; Hiroshi Sumita; Akira Mukaizaka; Goro Matsui, all of Hiroshima, Japan

[73] Assignee: Toda Kogyo Corp., Hiroshima, Japan

[21] Appl. No.: 820,811

[22] Filed: Aug. 1, 1977

[30] Foreign Application Priority Data

Aug. 9, 1976 [JP] Japan .................................. 51-95191

[51] Int. Cl.² ...................... C01G 49/06; C01G 49/08
[52] U.S. Cl. ................................. 252/62.56; 252/62.55
[58] Field of Search ........................... 252/62.55, 62.56

[56] References Cited

U.S. PATENT DOCUMENTS

| | | | |
|---|---|---|---|
| 4,015,030 | 3/1977 | Sasazawa et al. | 252/62.56 X |
| 4,033,891 | 7/1977 | Matsui et al. | 252/62.56 |
| 4,052,326 | 10/1977 | Schoenafinger | 252/62.56 |

FOREIGN PATENT DOCUMENTS

119997   1975   Japan.

*Primary Examiner*—Jack Cooper

[57] ABSTRACT

A process for treating acicular magnetite containing Co to stabilize the magnetic properties thereof comprises the steps of heating acicular magnetite containing 0.1 to 2.5% by atom of Co with respect to Fe as starting material at a temperature in the range of 300 – 1000° C in an inert gas atmosphere in which the partial pressure of oxygen is controlled at a value in the range of 0.001 – 1% by weight and for the time sufficient to homogenize the crystal structure of the acicular magnetite by thermal-diffusion of oxygen thereinto, and thereafter saturating the resultant acicular magnetite with oxygen by heating it at a temperature in the range of 40 – 100° C in an oxygen rich atmosphere such as air.

4 Claims, 6 Drawing Figures

PROCESS FOR TREATING ACICULAR MAGNETITE CONTAINING CO TO STABILIZE THE MAGNETIC PROPERTIES THEREOF

The present invention relates to the manufacture of acicular magnetite containing Co, and especially to a new process for treating acicular magnetite containing Co for stabilizing the magnetic properties thereof.

Lately, with the increasing tendency of recording signals in magnetic recording such as video cassette to be transferred into the short wave length range, a magnetic recording material is earnestly demanded in the art which has an intensive coercive force and excellent magnetic stability.

In acicular magnetite which has been conventionally used as a magnetic material, an intensive coercive force is obtained by making use of its shape-anisotropy. However, the coercive force of the acicular magnetite has been about 500 Oe at the highest, being unsatisfactory as that of a magnetic material by which high density recording and a high output property now demanded can be obtained. Therefore, in the conventional method, by adding cobalt to this acicular magnetite, an intensive coercive force is obtained through the making use of its crystal anisotropic energy. In this case, it is known that the coercive force is improved with the increase of Co-content of the magnetite.

However, it is also well known that the addition of Co to acicular magnetite brings not only the increase of the coercive force but also the large increase of magnetic instability e.g. the change with time lapse and the temperature dependence of the coercive force inevitably. Therefore, in the prior arts, efforts have been made to improve the magnetic stability of Co-containing acicular magnetite.

For example, Japanese Patent Laying Open No. 2998/1976 proposes a process comprising maturing Co-containing acicular magnetite at a temperature of 40°-80° C. in an inert gas for a long time more than 3 days.

Further, Japanese Patent Laying Open No. 119997/1975 discloses a process comprising immediately partially oxidizing, at 40°-100° C. in the air, Co-containing acicular magnetite obtained by the reduction of Co-containing acicular goethite. In the latter process, the final product is not pure magnetite but an intermediate substance between pure magnetite and maghemite.

The object of the present invention is, therefore, to provide a new and more effective process for stabilizing the magnetic properties of Co-containing acicular magnetite.

Other objects of the present invention will be apparent hereinafter.

In accordance with the features of the present invention, these and other objects are achieved by a process according to the present invention comprising the combination of the following steps:

heating acicular magnetite containing 0.1 to 2.5% by atom of Co with respect to Fe as starting material at a temperature in the range of 300°-1000° C. in an inert gas atmosphere in which the partial pressure of oxygen is controlled at a value in the range of 0.001-1% by weight and for the time sufficient to homogenize the crystal structure of the acicular magnetite by thermal-diffusion of oxygen thereinto, and thereafter saturating the resultant acicular magnetite with oxygen by heating it at a temperature in the range of 40°-100° C. in an oxygen rich atmosphere such as air.

Figure 4:
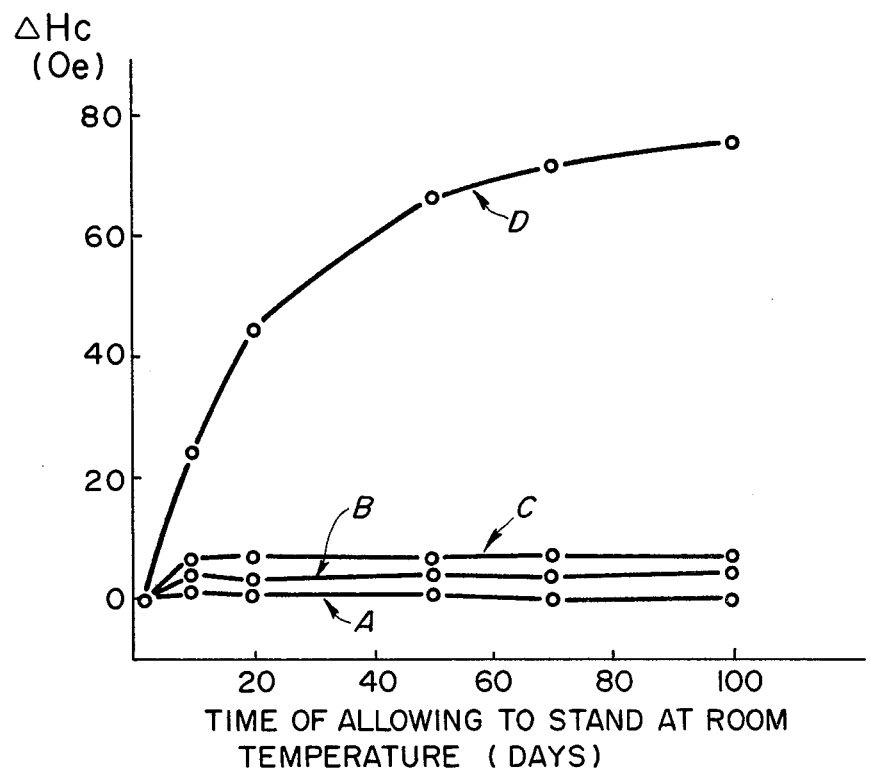
Figure 5:
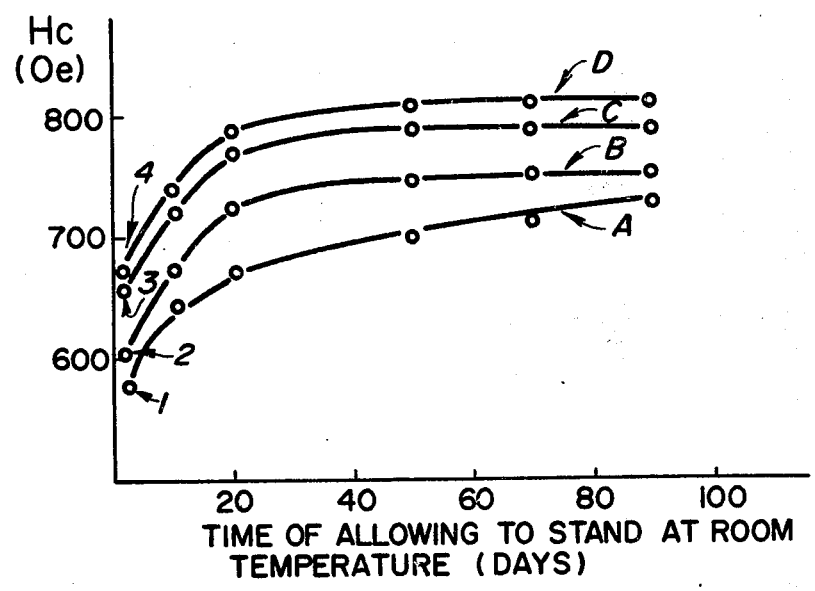
Figure 6:
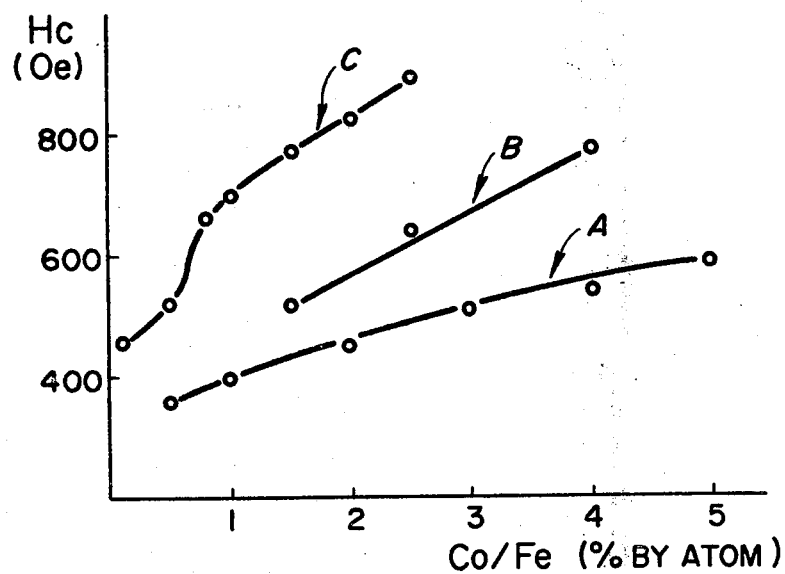

FIG. 4 is a view illustrating the relation between the deviation value ($\Delta Hc$) of the coercive force of particles and the time (days) for which the particles were allowed to stand at room temperature, said particles having been obtained by high temperature heat treating various kinds of Co-containing acicular magnetite powders in $N_2$ gas (the partial pressure of oxygen of the atmosphere being 0.008% by weight) and then low temperature heat treating the same in the air;

FIG. 5 is a view illustrating the change with time lapse of the coercive force of Co-containing acicular magnetite powder when it was allowed to stand at room temperature; and FIG. 6 is a view illustrating the relation between the Co-content and the coercive force of various kinds of Co-containing acicular magnetic iron oxide powders.

Acicular magnetite ($Fe_3O_4$) obtained by the reduction of acicular iron oxide hydroxide ($\alpha$-FeOOH) or acicular iron oxide ($\alpha$-$Fe_2O_3$) has a number of pores in its particles, imperfect and nonuniform arrangement of crystal lattice i.e. a number of defects in the lattice, so that its crystal structure per se is also extremely nonuniform.

This is because the reducing reaction for the manufacture of acicular magnetite which is a solid phase-gaseous phase reaction proceeds only nonuniformly and partially, and also because, since magnetite per se is chemically an unstable intermediate substance between metal iron and iron oxide, it is difficult to control with stoichiometrical strictness the process of the reducing reaction for the manufacture of the magnetite.

Further, it is apparent that the introduction of Co, a different kind of element, into the magnetite for increasing its crystal anisotropic energy causes to promote the abovementioned heterogeneous state of the crystal structure.

This heterogeneousness of the crystal structure of Co-containing acicular magnetite is possibly the one cause of the magnetic instability of the Co-containing acicular magnetite.

Therefore, one of the problems to be solved in order to overcome the magnetic instability of Co-containing acicular magnetite is to improve the remarkable heterogeneousness of the crystal structure thereof.

According to the present invention, the solution to this problem has been provided in such a manner as follows.

The inventors have long studied so as to rearrange imperfect and nonuniform crystal lattice of Co-containing acicular magnetite particles to make the same perfect, uniform and close. As the result, it has been found that, in addition to a heat treatment, a treatment of positively moving oxygen which has a larger ion radius than iron. That is, it has been found that by high temperature heat treating Co-containing acicular magnetite in an inert gas atmosphere (the partial pressure of oxygen being 0.001-1% by weight) to reach the equilibrium partial pressure of oxygen in accordance with Gibbs' phase rule, oxygen is discharged from the crystal lattice of the Co-containing acicular magnetite or is diffused and absorbed into the crystal lattice, to reach the equilibrium value, and at the same time the rearrangement of the crystal lattice is accomplished. Further, the rearrangement of the crystal lattice has also an effect of making close the crystal structure of the particles.

By the way, the basical idea on this homogenizing treatment of acicular magnetite per se has been already proposed in the inventors' U.S. Pat. application Ser. No. 553,325, now U.S. Pat. No. 4,033,891 the invention of which relates to the manufacture of acicular maghemite ($\alpha$-$Fe_2O_3$) and not to Co-containing acicular magnetite.

As the result of further study, however, it has been found that by the said homogenizing treatment only, the magnetic instability e.g. the change with time lapse of the coercive force cannot be satisfactorily improved as apparent from the data of the experiments given with reference to FIG. 3 et al., below.

This is because since Co-containing magnetite is non-stoichiometrical substance as well as an unstable intermediate substance between a metal and a stable oxide, the inherent chemical and physical instability thereof i.e. the tendency of degeneration such as by oxidation in the air or by redistribution of $Fe^{2+}$ and $Co^{2+}$ in the crystal has not been fully overcome, even if it has homogenized crystal structure.

Surprisingly, it has been proved that this serious problem can be fully solved by a new treatment according to the present invention, which comprises saturating the Co-containing acicular magnetite after subjected to the homogenizing treatment with oxygen by heating it at a temperature in the range of 40°-100° C. in an oxygen rich atmosphere such as air.

According to the experiments, it is confirmed that by this oxygen-saturation treatment, Co-containing acicular magnetite is not partially oxidized as in the said one of the prior arts, but oxygen is rapidly only absorbed by the particles thereof to the saturated absorption value. Therefore, it is critical in this treatment that a sufficient amount of oxygen and the Co-containing magnetite are contacted with each other at as high a temperature as possible under the condition of preventing the partial oxidation of the magnetite, thereby causing a rapid absorption reaction.

Figure 1:
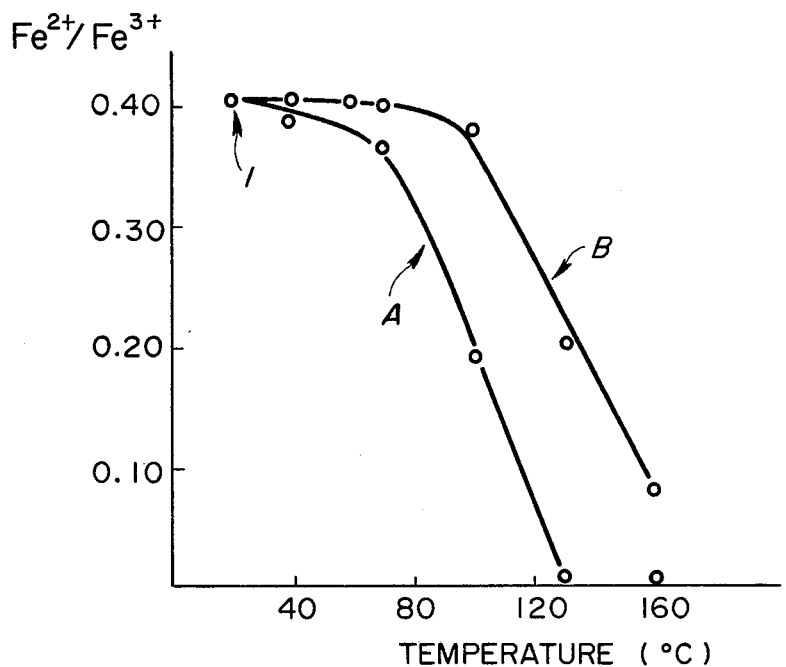
FIG. 1 is a view illustrating the relation between the temperature and the $Fe^{2+}/Fe^{3+}$ weight ratio in case of low temperature treatment of Co-containing acicular magnetite powder in the air.
Figure 2:
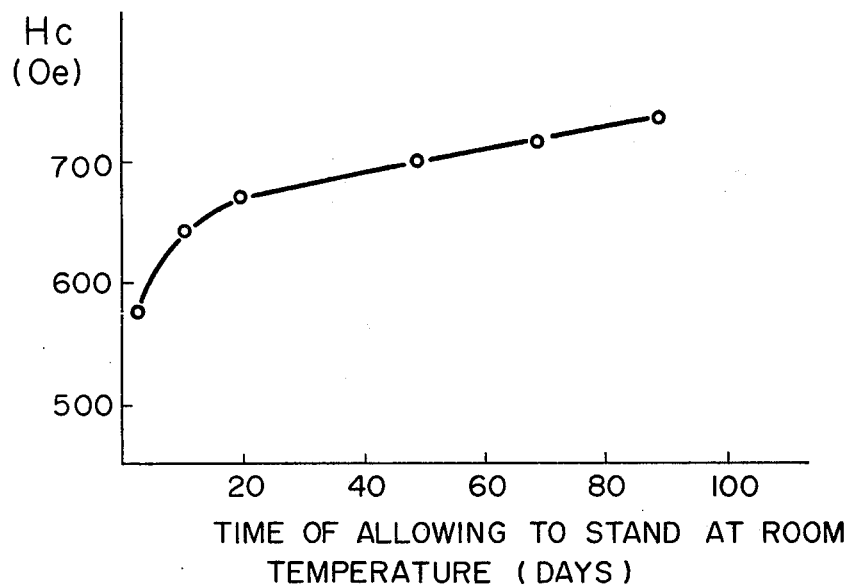
FIGS. 2 and 3 are views illustrating the relation between the time (days) for which Co-containing acicular magnetite powder was allowed to stand at room temperature and the coercive force of the magnetite powder.
Figure 3:
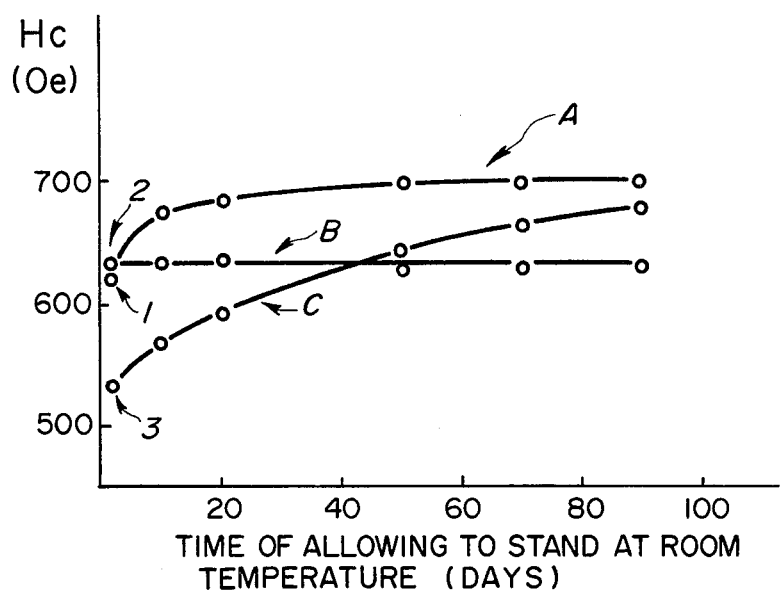

As generally well known and also apparently shown in the belowmentioned description of the data of the experiment given with reference to FIGS. 1 to 3, normal Co-containing acicular magnetite not subjected to the homogenizing treatment according to the present invention is partially oxidized rapidly at a temperature about 40° C. in the air. Therefore, critically important in the present invention is to subject Co-containing acicular magnetite as starting material obtained by the reduction of Co-containing acicular ferric hydroxide, Co-containing acicular ferric oxide or the like to the homogenizing treatment, prior to oxygen saturation treatment, i.e. to combine the abovementioned two treatments. The physical and chemical mechanism why, by subjecting the Co-containing acicular magnetite after the homogenizing treatment to the oxygen-saturation treatment according to the present invention, the perfect prevention of the change with time lapse of the coercive force i.e. the perfect magnetic stability of the Co-containing acicular magnetite can be achieved has not been fully apparent yet at present, but it would be due to the following reasons.

If Co-containing acicular magnetite particle powder obtained by the reducing reaction by heating in a reducing atmosphere is taken out in the air, $Fe^{2+}$ in the Co-containing acicular magnetite is oxidized and decreased in amount to be less than the stoichiometrical amount, thereby causing to bring vacancy in the crystal lattice thereof. Further, if such Co-containing acicular magnetite particle powder is allowed to stand at room temperature, cations ($Fe^{2+}$ and $Co^{2+}$) are caused to move through the abovementioned vacancy to the stable positions, whereby the coercive force is thought to gradually increase with time lapse.

Consequently, it is presumed to be due to the way how ions in the crystal lattice are positioned that the coercive force of the Co-containing acicular magnetite particle powder changes with time lapse when it is allowed to stand at room temperature. Especially, if $Fe^{2+}$, $Co^{2+}$, $O^{2-}$ in B sub-lattice in the crystal lattice of the Co-containing acicular magnetite particles are irregularly positioned with respect to the vacancy $Fe^{2+}$ and $Co^{2+}$ are easy to move, so that when the particles are allowed to stand at room temperature $Fe^{2+}$ and $Co^{2+}$ are caused to move through the vacant positions to the stable positions, thereby causing the change with time lapse of the coercive force.

Therefore, it is thought that by making close the crystal lattice of the Co-containing acicular magnetite particles and rearranging the crystal lattice, and then fixing $Fe^{2+}$ and $Co^{2+}$, the change with time lapse of the coercive force can be prevented. Presumably, by high temperature heat treating the Co-containing acicular magnetite particle powder at a temperature in a range of 300°-1000° C. in an inert gas atmosphere with controlling the partial pressure of oxygen in the atmosphere by adding a small amount of $O_2$ gas (0.001-1.0% by weight) thereinto according to the present invention, and then low temperature heat treating the same at a temperature in the range of 40°-100° C. in an oxygen atmosphere, $Fe^{2+}$ and $Co^{2+}$ in the crystal lattice of the Co-containing acicular magnetite particles have been fixed.

Now, conditions in carrying out the process according to the present invention will be described in the following.

STARTING MATERIAL

Co-containing acicular magnetite particle powder according to the present invention is intended to mean particle powder obtained by adding an aqueous solution of Cobalt salt to the reaction solution during a wet reaction of an aqueous solution of ferrous sulfate with an alkali to obtain Co-containing acicular ferric hydroxide particles and heat-dehydrating and then reducing the particles, or particle powder obtained by making Cobalt to be absorbed onto the surfaces of particles of acicular ferric hydroxide, acicular $\alpha$-hematite or acicular maghematite and then reducing the same.

When the Co-containing acicular magnetite particle powder has $Fe^{2+}$/$Fe^{3+}$ weight ratio below 0.3, i.e. the amount of $Fe^{2+}$ is small, the number of vacancy in the B sub-lattice in the crystal lattice and therefore no remarkable effect can be obtained by the high temperature heat treatment in an inert gas containing a small amount of oxygen gas (0.001-1.0% by weight), resulting in the failure of obtaining particles having an intensive coercive force as the final products. It is impossible to industrially produce Co-containing acicular magnetite particle powder having $Fe^{2+}/Fe^{3+}$ weight ratio above 0.49.

The present invention has an object of obtaining Co-containing acicular magnetite particle powder having a coercive force of 400–800 Oe which does not change with time lapse, and therefore the Co-content with respect to Fe of 0.1–2.5% by atom is sufficient. When the Co-content is below 0.1% by atom, no improvement in the coercive force is observed by the addition of Co. In case of the coercive force above 2.5% by atom, no effect of controlling the change with time lapse of the coercive force cannot be observed. According to the object of the present invention, 0.5–2.0% by atom is most effective.

HOMOGENIZING TREATMENT

In the homogenizing treatment of the process according to the present invention, as the partial pressure of oxygen in the inert gas atmosphere becomes high, Co-containing acicular magnetite particle powder is more apt to be oxidized, and when the partial pressure of oxygen becomes higher than a certain value, sudden oxidation occurs to fail in obtaining the aimed Co-containing acicular magnetite particle powder having $Fe^{2+}/Fe^{3+}$ weight ratio above 0.3. Further, when the partial pressure of oxygen in the inert gas atmosphere becomes lower than a certain value, a very long time is required for achieving the equilibrium partial pressure of oxygen, and the closeness of the crystal and the rearrangement of the crystal lattice cannot be effectively achieved. Therefore, preferably the partial pressure of oxygen in the inert gas atmosphere is controlled. Usually, preferable is the partial pressure of oxygen in the inert gas atmosphere in the range of about 0.001–1% by weight.

In carrying out the process according to the present invention, the control of the partial pressure of oxygen in the inert gas atmosphere can be effected e.g. by a method of reducing the pressure in the container, a method of mixing stoichiometrically the material to be treated (Co-containing acicular magnetite particles) and oxygen gas and sealing the same into the container, a method of using a mixture of an inert gas and oxygen gas or other various methods. However, the most convenient method is using an inert gas in which the parallel pressure of oxygen has been controlled. The partial pressure in the said inert gas atmosphere is controlled to be 0.001–1% by weight, in relation to the properties and weight of Co-containing magnetite particles as the material to be treated as well as the temperature and the time of the heat treatment in the inert gas atmosphere. As inert gases usable in the process according to the present invention, there are $N_2$, He, Ne, Ar, Kr, Xe or other gases.

When the homogenizing treatment in the inert gas containing small amount of oxygen gas (0.001–1.0% by weight) below 300° C. or above 1000° C., the closeness of the crystal and the rearrangement of the crystal lattice thereof cannot be sufficiently obtained. Further, the heat treatment at a temperature as high as above 1000° C. in the inert gas atmosphere containing a small amount of oxygen gas (0.001–1.0% by weight) is apt to cause the deformation of the acicular particles and the sintering of the individual particles or particles with one another, and further requires precision equipments and highly skilled art, which is not preferable from the industrial and economical points. In view of the shape of the particles, sintering of individual particles or particles with each other, and further, industrial materials, structures of equipments or the like, heating temperature in the range of 350°–800° C. is preferable.

OXYGEN-SATURATION TREATMENT

When the oxygen saturation treatment in the atmosphere containing oxygen is carried out at a temperature below 40° C., the rapid absorbing reaction of oxygen does not proceed. At a temperature above 100° C., the oxidation of $Fe^{2+}$ unpreferably proceeds. In view of the object of the present invention, most preferable is 70°–100° C.

The atmosphere containing oxygen used in this treatment means an atmosphere which has such an oxygen concentration allowing the contact absorbing reaction of oxygen with the magnetite particles to reach the saturation value under the said conditions in a few hours at longest, and most generally air is used.

The Co-containing acicular magnetite particle powder obtained according to the abovementioned process of the present invention is such that the disadvantageous change with time lapse of its coercive force has been extremely controlled. Further, the particle powder shows an extremely intensive coercive force even with a small value of Co-content, and therefore is usable as high output and high density recording magnetic materials especially suitable for video-cassettes with improvement in their magnetic stability e.g. change with time lapse of the coercive force, extinction property, temperature dependance and the like.

Other advantages of the present invention will become apparent from the following description of the Test Examples and Examples. Some of Test Examples carried out by the inventors will be now described with reference to the appended drawings.

FIG. 1 illustrates $Fe^{2+}/Fe^{3+}$ weight ratio of Co-containing acicular magnetite particle powder.

A in the drawing illustrates $Fe^{2+}/Fe^{3+}$ weight ratio of particles obtained by low temperature heat treating Specimen 1 at a temperature in the range of 20°–160° C. for 30 min. in the air, said Specimen 1 being Co-containing acicular magnetite particles having $Fe^{2+}/Fe^{3+}$ weight ratio of 0.41 and containing 1.52% by atom of Co with respect to Fe.

B illustrates $Fe^{2+}/Fe^{3+}$ weight ratio of particles obtained by putting 500g of Specimen 1 into a 5 l retort container with one end open, high temperature heat treating the same at 700° C. for 15 min. in a stream of $N_2$ gas containing 80ppm of $O_2$ at the rate of 2l/min. (partial pressure of $O_2$ in the atmosphere being 0.008% by weight) and then low temperature heat treating at a temperature in the range of 20°–160° C. for 30 min. in the air during which treatments the container was rotated. In case of A, $Fe^{2+}/Fe^{3+}$ weight ratio dropped suddenly when the temperature was raised above 70° C. However, in case of B, $Fe^{2+}/Fe^{3+}$ weight ratio showed substantially no change at 90° C., and began to drop for the first time beyond 100° C. That is, in case of B, oxidation of $Fe^{2+}$ is extremely difficult to occur in comparison with case of A. It is understood that this is due to the result of the fact that the crystal of the Co-containing acicular magnetite particle had become close and the crystal lattice had been rearranged by high temperature heat treating the particle powder at 700° C. in the stream of $N_2$ gas containing 80ppm of $O_2$.

FIGS. 2 and 3 illustrate the relation between the time (days) for which Co-containing acicular magnetite particle powder was allowed to stand at room temperature and the coercive force of the particle powder. FIG. 2 illustrates the change with time lapse of the coercive force of the Co-containing acicular magnetite particle powder having $Fe^{2+}/Fe^{3+}$ weight ratio of 0.35 and containing 2.0% by atom of Co with respect to Fe when allowed to stand at room temperature, said particle powder had been obtained by heat reducing Co-containing acicular ferric hydroxide at 350° C. in a stream of $H_2$ gas.

FIG. 3 illustrates the change with time lapse of the coercive force of the Co-containing acicular magnetite particle powder when allowed to stand at room temperature, said particle powder having $Fe^{2+}/Fe^{3+}$ weight ratio of 0.41, containing 1.52% by atom of Co with respect to Fe and treated in various steps.

A in the drawing illustrates the change with time lapse of Specimen 1 which is obtained by putting 500g of the abovementioned Co-containing acicular magnetite particle power into a 5l retort container, and high temperature heat treating at 700° C. for 15 min. in a stream of $N_2$ gas containing 80ppm of $O_2$ at the rate of 2l/min. (the partial pressure of oxygen in the atmosphere being 0.008% by weight). B illustrates the change with time lapse of Specimen 2 obtained by further low temperature heat treating Specimen 1 at 70° C. for 15 min. in the air, while C, the change with time lapse of Specimen 3 obtained by low temperature heat treating the starting material at 70° C. for 15 min. in the air.

In the Specimen in FIG. 2 and Specimen 1 and 3 in FIG. 3, the coercive force rose with the days of standing at room temperature, while in Specimen 2 in FIG. 3, the coercive force showed substantially a constant value. Probably such substantially no change in the coercive force of Specimen 2 is due to the effect of the additional low temperature heat treatment at 70° C. for 15 min. in the air carried out after the high temperature heat treatment at 700° C. for 15 min. in the stream of $N_2$ gas containing 80 ppm of $O_2$.

The abovementioned results of the experiments showed that by high temperature heat treating the Co-containing acicular magnetite particle powder in a stream of $N_2$ gas containing a small amount of $O_2$ gas (0.001–1.0% by weight) the closeness of the crystal of the particles and the rearrangement of the crystal lattice was achieved, and by then low temperature heat treating the particle powder at 70° C. for 15 min. in the air, $Fe^{2+}$ and $Co^{2+}$ positioned in B Sub-lattice in the crystal lattice became fixed.

In Specimen 1 in FIG. 3 the closeness of thecrystal of the Co-containing acicular magnetite particles and the rearrangement of the crystal lattice had been obtained, but $Fe^{2+}$ and $Co^{2+}$ had not been fixed, so that the coercive force probably changed with time lapse when the particles were allowed to stand at room temperature.

Specimen 3 shown in FIG. 3 showed that the change with time lapse of the coercive force cannot be prevented only by low temperature heat treating the particles in the air.

Further, according to the experiments, FIG. 4 illustrates the relation between the deviation value ($\Delta Hc$) of the coercive force of the particle and the time (days) for which the particle was allowed to stand, at room temperature, said particle being obtained by putting 500g of various kinds of Co-containing acicular magnetite particle powders in a 5l retort container with one end open and high temperature heat treating the same at 800° C. for 5 min. in a stream of $N_2$ gas containing 80ppm of $O_2$ (the partial pressure of oxygen of the atmosphere being 0.008% by weight) at the rate of 2l/min., and then low temperature heat treating the same at 70° C. for 15 min. in the air. A, B, C and D in the drawing indicate the cases of Co-containing acicular particle powders which contain 0.84%, 1.52%, 2.30% and 3.00% by atom respectively of Co with respect to Fe. The coercive forces of A, B and C are all less than 5–10 Oe, while that of D is as large as 75 Oe. It proves that with the content of Co with respect to Fe more than 2.5% by atom, the change with time lapse of the coercive force becomes great.

As abovementioned, according to the present invention, the change with time lapse of the coercive force per se can be restrained, unlike the conventional improvement in which the change with time lapse of the coercive force is intentionally promoted.

FIG. 5 illustrates the change with time lapse of the coercive force of Co-containing acicular magnetite particles when allowed to stand at room temperature. In the drawing, Specimen 1 comprises Co-containing acicular magnetite particle powder having $Fe^{2+}/Fe^{3+}$ weight ratio of 0.35 and containing 2.00% by atom of Co with respect to Fe. And Specimens 2, 3 and 4 were obtained by putting 500g of the particle powder of Specimen 1 in a 5l retort container, and high temperature heat treating the particle powder at 600° C. for 30 min. (Specimen 2), at 350° C. for 120 min. (Specimen 3) and at 800° C. for 5 min. (Specimen 4) respectively in a stream of $N_2$ gas containing 80ppm of $O_2$ at the rate of 2l/min. (the partial pressure of oxygen of the atmosphere being 0.008% by weight) while rotating the container. In the drawing, A, B, C and D illustrate the cases of allowing the Specimens 1, 2, 3 and 4 stand at room temperature, respectively.

As shown by Specimens 2, 3 and 4 in FIG. 5, the coercive force of the Co-containing acicular magnetite particle powder is raised by the high temperature heat treatment in a stream of $N_2$ gas containing 80ppm of $O_2$, and further raised with time lapse by allowing the same to stand at room temperature to reach the saturation value in a relatively short time. Therefore, the high temperature heat treatment of Co-containing acicular magnetite particle powder in a stream of $N_2$ gas containing a small amount of $O_2$ gas (0.001–1.0% by weight) enables to obtain an intensive coercive force of the particle even with a small Co-content.

Further by low temperature heat treating the abovementioned high temperature heat treated particle powder in the temperature range of 20 to 100° C. in the air, the change with time lapse of the coercive force of the particle can be restrained.

Therefore, it is possible to obtain Co-containing acicular magnetite particle powder with a small Co-content but with a desired coercive force the change of which with time lapse is restrained.

FIG. 6 illustrates the relation between the Co-content and the coercive force of Co-containing acicular magnetic iron oxide particle powder. In the drawing, A illustrates the relation between the Co-content and the coercive force of most conventionally known Co-containing acicular maghemite particle powder, e.g. that as described in Japanese Patent Laying Open No. 27719/72. B illustrates the relation between the Co-content and the coercive force of Co-containing acicular Berthollide type iron oxide particle powder, e.g. that as described in Japanese Patent Laying Open No.

119997/1975. C illustrates the Co-content and the coercive force of Co-containing acicular magnetite particle powder obtained by putting 500g of various kinds of Co-containing magnetite particle powder in a 5l retort container with one end open, high temperature heat treating the same at 800° C. for 5 min. in a stream of $N_2$ gas containing 80ppm of $O_2$ at the rate of 2l/min. (the partial pressure of oxygen of the atmosphere being about 0.008% by weight) while rotating the container and then low temperature heat treating at 80° C. for 15 min. in the air. As shown in FIG. 6, a desired coercive force can be obtained according to the invention sufficiently with less than 50% of Co-content in comparison with the case of the conventional method.

Nowadays, the coercive force of the magnetic material for use in video cassette is required to be 400–800 Oe. According to the present invention, this requirement can be sufficiently fulfilled with the material having Co-content with respect to Fe of as small a value as being 2% by atom.

EXAMPLE 1

500g of Co-containing acicular magnetite particle powder having $Fe^{2+}/Fe^{3+}$ weight ratio of 0.41, 1.52% by atom of Co with respect to Fe and coercive force Hc of 526 Oe was put in a retort container with one end open. While rotating the container, the particle powder was subjected to high temperature heat treatment at 350° C. for 120 minutes in a stream of $N_2$ gas containing 80ppm of $O_2$ at a rate of 3l/min. (partial pressure of oxygen of the atmosphere being 0.008% by weight) and then cooled. A part of the Co-containing acicular magnetite particle powder was taken out in the air. This particle powder had $Fe^{2+}/Fe^{3+}$ weight ratio of 0.39 and coercive force Hc of 634 Oe.

While successively rotating the said retort container with one end open, the remaining particle powder was subject to low temperature heat treatment at 70° C. for 15 min. in a stream of air at the rate of 5l/min. and then cooled. The Co-containing acicular magnetite particle powder was taken out in the air. This particle powder had $Fe^{2+}/Fe^{3+}$ weight ratio of 0.37 and coercive force Hc of 638 Oe. The coercive force of this Co-containing acicular magnetite particle powder when allowed to stand at room temperature was shown in Table 3.

EXAMPLES 2–15 & Reference EXAMPLES 5 & 6

In these Examples and Reference Examples, Co-containing acicular magnetite particle powder was obtained in the same manner as in Example 1 except that the kind of Co-containing acicular magnetite particle powder as the starting material, the partial pressure of oxygen of $N_2$ gas atmosphere, and the temperatures and times of the high temperature heat treatment and the low temperature heat treatment in the air respectively were variously changed.

The main preparing conditions and the properties of the particle powder were shown in Tables 1 and 2.

Further, the coercive forces of the said Co-containing acicular magnetite particle powders when allowed to stand at room temperature were shown in Tables 3 and 4.

Reference Example 1

600g of Co-containing acicular $\alpha$-FeOOH particle powder containing 2.08% by atom of Co with respect to Fe was put into a retort container with one end open as abovementioned. While rotating the container, the particle powder was heat-reduced in a stream of $H_2$ gas, whereby Co-containing acicular magnetite particle powder having $Fe^{2+}/Fe^{3+}$ weight ratio of 0.34 was obtained. The coercive force Hc of the obtained particle powder was 584 Oe. The coercive force of this particle powder when allowed at room temperature was shown in Table 4.

REFERENCE EXAMPLE 2

500g of the same starting material as used in Example 14 was put into a retort container with one end open. While rotating the container, the particle powder was subject to high temperature heat treatment at 350° C. for 120 min. in a stream of $N_2$ gas containing 150ppm of $O_2$ at the rate of 3l/min. (the partial pressure of oxygen of the atmosphere being 0.015% by weight), then cooled and taken out in the air. The obtained particle powder had $Fe^{2+}/Fe^{3+}$ weight ratio of 0.34 and coercive force Hc of 605 Oe.

The coercive force of this Co-containing acicular magnetite particle powder when allowed to stand at room temperature was shown in Table 4.

REFERENCE EXAMPLE 3

Co-containing acicular magnetite particle powder was obtained in the same manner as in Reference Example 2 except that the same starting material with that of Example 1 was used and that the temperature and time of the high temperature heat treatment with $N_2$ gas were changed. The main preparing conditions and the properties were shown in Table 2, and the coercive force when allowed to stand at room temperature in Table 4.

REFERENCE EXAMPLE 4

500g of the same starting material with that of Example 1 was put into a retort container as abovementioned. While rotating the container, the material was subject to low temperature heat treatment at 70° C. for 15 min. in a stream of air at the rate of 5l/min. and then cooled, and Co-containing acicular magnetite particle powder was taken out in the air. The obtained Co-containing acicular magnetite particle powder had $Fe^{2+}/Fe^{3+}$ weight ratio of 0.29 and coercive force Hc of 532 Oe. The coercive force of this Co-containing acicular magnetite when allowed to stand at room temperature was shown in Table 4.

REFERENCE EXAMPLE 7

500g of the same starting material with that of Example 1 was put into a retort container with one end open as abovementioned. While rotating the container, the material was subject to high temperature heat treatment at 350° C. for 120 min. in a stream of $N^2$ gas containing 23.2% by weight of $O_2$ at the rate of 3l/min. (the partial pressure of oxygen of the atmosphere being 23.2% by weight, which corresponds to that of air), then cooled and taken out in the air. The obtained particles were maghemite particles (Co-containing $\gamma$-$Fe_2O_3$ particles) having $Fe^{2+}/Fe^{3+}$ weight ratio of 0. The main conditions during the preparation and the properties of the particles were shown in Table 1.

Table 1

| | Particle of starting material | | | Heat treatment in N₂ gas | | | | | Heat treatment in air | | | |
|---|---|---|---|---|---|---|---|---|---|---|---|---|
| | | | | Partial pressure of O₂ in atmosphere (wt %) | | | Treated particle | | | | Treated particle | |
| Example | Co/Fe (atom %) | $Fe^{2+}/Fe^{3+}$ | Coercive force (Hc) (Oe) | | Temp. (°C) | Time (min.) | $Fe^{2+}/Fe^{3+}$ | Coercive force (Hc) (Oe) | Temp. (°C) | Time (min.) | $Fe^{2+}/Fe^{3+}$ | Coercive force (Hc) (Oe) |
| 1 | 1.52 | 0.41 | 526 | 0.008 | 350 | 120 | 0.39 | 634 | 70 | 15 | 0.37 | 638 |
| 2 | " | " | " | " | 450 | 60 | 0.38 | 582 | " | " | 0.38 | 575 |
| 3 | " | " | " | " | 600 | 30 | 0.40 | 600 | " | " | 0.39 | 592 |
| 4 | " | " | " | " | 700 | 15 | 0.39 | 622 | " | " | 0.36 | 626 |
| 5 | " | " | " | " | 800 | 5 | 0.40 | 675 | " | " | 0.37 | 678 |
| 6 | " | " | " | " | 600 | 30 | 0.35* | 665* | " | " | 0.36 | 660 |
| 7 | " | " | " | " | 800 | 5 | 0.36 | 737 | " | " | 0.35 | 742 |
| 8 | " | " | " | " | 700 | 15 | 0.39 | 620 | 40 | 60 | 0.38 | 610 |
| 9 | " | " | " | " | " | " | " | " | 55 | 30 | 0.39 | 624 |
| 10 | " | " | " | " | " | " | " | " | 90 | 15 | 0.40 | 620 |

*Allowed to stand at room temperature for 10 days.

Table 2

| | Particle of starting material | | | Heat treatment in N₂ gas | | | | | Heat treatment in a air | | | |
|---|---|---|---|---|---|---|---|---|---|---|---|---|
| | | | | Partial pressure of O₂ in atmosphere (wt %) | | | Treated particle | | | | Treated particle | |
| Example & Reference example | Co/Fe (atom %) | $Fe^{2+}/Fe^{3+}$ | Coercive force (Hc) (Oe) | | Temp. (°C) | Time (min.) | $Fe^{2+}/Fe^{3+}$ | Coercive force (Hc) (Oe) | Temp. (°C) | Time (min.) | $Fe^{2+}/Fe^{3+}$ | Coercive force (Hc) (Oe) |
| Example | | | | | | | | | | | | |
| 11 | 0.55 | 0.44 | 430 | 0.015 | 600 | 30 | 0.41 | 455 | 50 | 30 | 0.39 | 452 |
| 12 | 1.21 | 0.35 | 478 | 0.3 | 700 | 15 | 0.37 | 532 | 80 | 15 | 0.35 | 536 |
| 13 | 1.84 | 0.38 | 532 | 0.1 | 350 | 120 | 0.36 | 576 | 90 | " | 0.36 | 570 |
| 14 | 2.00 | 0.35 | 580 | 0.035 | 800 | 5 | 0.36 | 673 | 70 | " | 0.35 | 685 |
| 15 | " | " | " | " | " | " | 0.34* | 805* | 90 | " | 0.35 | 790 |
| Reference example | | | | | | | | | | | | |
| 1 | 2.08 | 0.34 | 584 | — | — | — | — | — | — | — | — | — |
| 2 | 2.00 | 0.35 | 580 | 0.015 | 350 | 120 | 0.34 | 605 | — | — | — | — |
| 3 | 1.52 | 0.41 | 526 | " | 700 | 15 | 0.39 | 622 | — | — | — | — |
| 4 | " | " | " | — | — | — | — | — | 70 | 15 | 0.29 | 532 |
| 5 | 3.00 | 0.35 | 608 | 0.015 | 800 | 5 | 0.36 | 721 | " | " | 0.37 | 726 |
| 6 | 1.84 | 0.25 | 488 | " | " | " | 0.22 | 455 | " | " | 0.20 | 430 |
| 7 | 1.52 | 0.41 | 526 | 23.2 | 350 | 120 | 0.00 | 428 | — | — | — | — |

*Allowed to stand at room temperature for 10 days.

Table 3

| Treated particle (Example No.) | Coercive force after allowed to stand at room temperature Hc (Oe) | | | | | | |
|---|---|---|---|---|---|---|---|
| | 1 day | 3 days | 10 days | 20 days | 50 days | 70 days | 100 days |
| Example 1 | 638 | 640 | 637 | 642 | 639 | 644 | 641 |
| 2 | 575 | 573 | 570 | 576 | 575 | 577 | 580 |
| 3 | 592 | 596 | 598 | 595 | 594 | 595 | 596 |
| 4 | 626 | 626 | 630 | 632 | 628 | 630 | 632 |
| 5 | 678 | 678 | 683 | 681 | 683 | 682 | 683 |
| 6 | 660 | 661 | 664 | 660 | 663 | 667 | 665 |
| 7 | 742 | 745 | 743 | 748 | 750 | 750 | 748 |
| 8 | 610 | 613 | 613 | 616 | 614 | 618 | 617 |
| 9 | 624 | 620 | 623 | 626 | 625 | 624 | 628 |
| 10 | 620 | 621 | 625 | 623 | 626 | 628 | 625 |

Table 4

| Treated particle (Example No. & Reference ex. No.) | Coercive force after allowed to stand at room temperature Hc (Oe) | | | | | | |
|---|---|---|---|---|---|---|---|
| | 1 day | 3 days | 10 days | 20 days | 50 days | 70 days | 100 days |
| Example 11 | 452 | 455 | 456 | 450 | 454 | 453 | 455 |
| 12 | 536 | 538 | 535 | 533 | 536 | 538 | 541 |
| 13 | 570 | 571 | 575 | 573 | 576 | 578 | 574 |
| 14 | 685 | 680 | 684 | 686 | 685 | 692 | 690 |
| 15 | 790 | 788 | 791 | 795 | 795 | 794 | 798 |
| Reference example 1 | 584 | 610 | 645 | 674 | 703 | 718 | 735 |
| 2 | 605 | 620 | 675 | 728 | 744 | 748 | 760 |
| 3 | 622 | 640 | 676 | 685 | 700 | 705 | 705 |
| 4 | 532 | 544 | 568 | 595 | 646 | 670 | 684 |
| 5 | 726 | 732 | 751 | 772 | 793 | 798 | 803 |
| 6 | 430 | 438 | 452 | 463 | 471 | 474 | 476 |

What is claimed is:

1. A process for treating acicular magnetite containing Co to stabilize the magnetic properties against change with lapse of time, comprising the steps of:
heating acicular magnetite having a $Fe^{2+}/Fe^{3+}$ weight ratio in the range of 0.3 to 0.49 and containing 0.1 to 2.5% by atom of Co with respect to Fe as starting material at a temperature in the range of 300–1000° C. in an inert gas atmosphere in which the partial pressure of oxygen is controlled at a value in the range of 0.001–1% by weight and for a time sufficient to effect the equilibrium partial pressure of oxygen in accordance with Gibb's phase rule,
and thereafter saturating the resultant acicular magnetite with oxygen by heating it at a temperature in the range of 40 to 100° C. in an air atmosphere while substantially retaining the value of the $Fe^{2+}/Fe^{3+}$ weight ratio that is exhibited by said acicular magnetite after the heating in said inert atmosphere and prior to said saturating with oxygen, whereby obtaining an acicular magnetite having highly stable coercive force with lapse of time.

2. The process of claim 1, in which the acicular magnetite as starting material contains 0.5 to 2% by atom of Co with respect to Fe.

3. The process of claim 1, in which the step of saturating the acicular magnetite with oxygen is effected at a temperature in the range of 70 to 100° C.

4. The process of claim 1, in which the step of heating the acicular magnetite in the inert gas atmosphere is effected at a temperature in the range of 350 to 800° C.

* * * * *

UNITED STATES PATENT AND TRADEMARK OFFICE
CERTIFICATE OF CORRECTION

PATENT NO. : 4,136,049

DATED : January 23, 1979

INVENTOR(S) : Nanao Horiishi et al

It is certified that error appears in the above-identified patent and that said Letters Patent are hereby corrected as shown below:

On the title page the following inventor should be added: Koji Toda.

Signed and Sealed this

Twenty-fourth Day of April 1979

[SEAL]

Attest:

RUTH C. MASON
Attesting Officer

DONALD W. BANNER
Commissioner of Patents and Trademarks